UNITED STATES PATENT OFFICE.

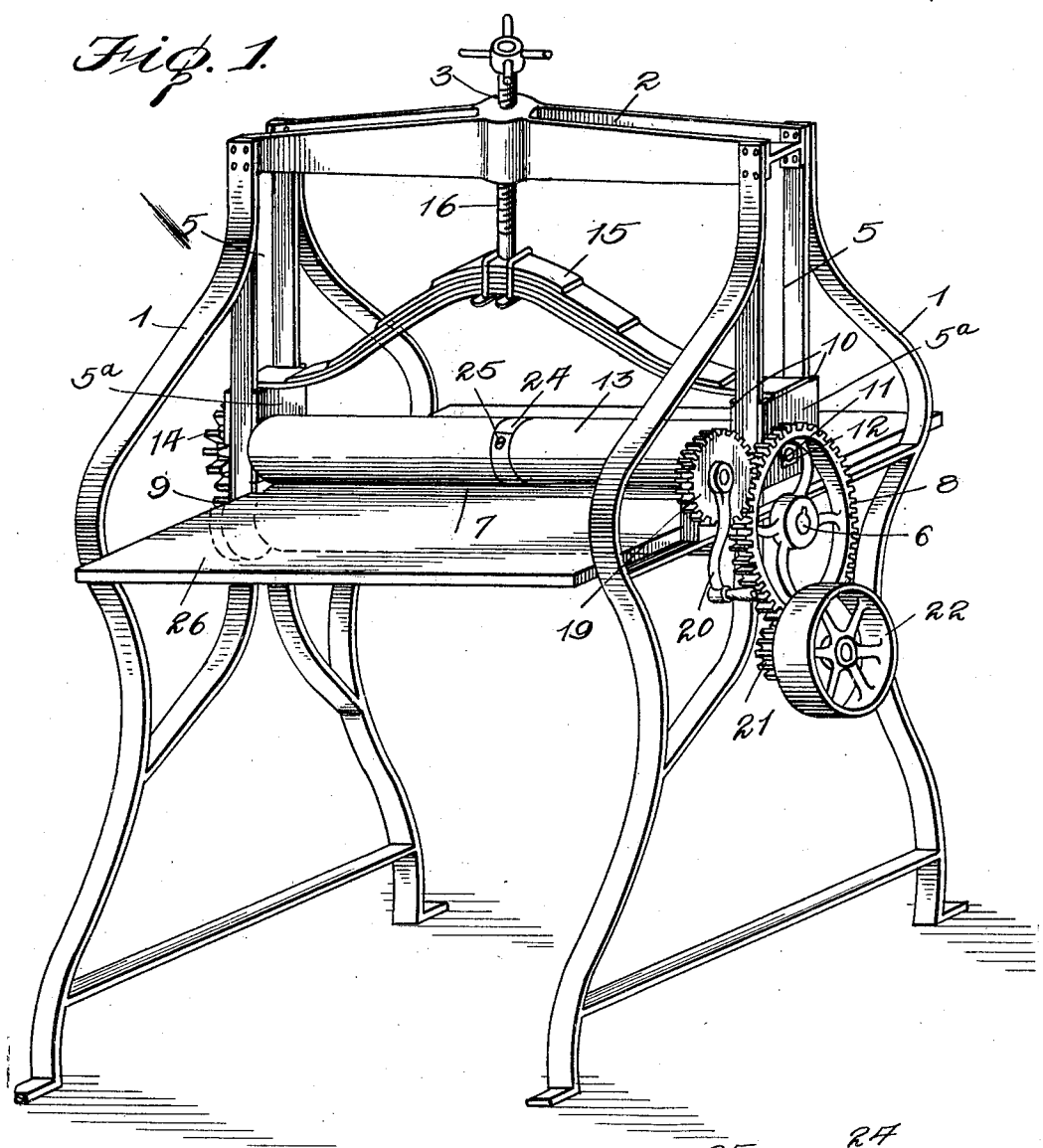

VICTOR A. NELSON, OF BREMERTON, WASHINGTON.

MANGLE.

1,321,542.  Specification of Letters Patent.  Patented Nov. 11, 1919.

Application filed March 21, 1919. Serial No. 284,068.

*To all whom it may concern:*

Be it known that I, VICTOR A. NELSON, a citizen of the United States, residing at Bremerton, in the county of Kitsap and State of Washington, have invented certain new and useful Improvements in Mangles, of which the following is a specification.

This invention relates to improvements in mangles.

The primary object of the invention is to provide a mangle which will permit the mangling of clothes without liability of stripping off the buttons.

The invention also comprehends improvements in the details of construction and arrangement of parts which will be hereinafter described and particularly pointed out in the claim.

In the drawings:—

Figure 1 is a perspective view of the mangle.

Fig. 2 is a detail section taken through the rollers.

Fig. 3 is a detail perspective view of the detachable clip employed in connection with one of the rollers.

In the drawing, 1 indicates a pair of side frames, connected at their upper ends by a yoke 2, the latter having a centrally threaded opening 3. The side frames are provided with vertical guideways 5, and in the bottom of same are alined bearings which receive the ends of a shaft 6. On the shaft 6 is a roller 7, and at one end is a gear wheel 8, and at the opposite end is a pinion 9, the teeth of which are deep.

Located in the guideways 5, are alined blocks, 5ª having gibs 10, to engage the guides, and alined bearings 11, which receive the ends of a shaft 12, and on the shaft is a roller 13. On one end of the shaft 12, is a pinion 14, the teeth of which are deep, and which mesh with the pinion 9.

A stiff flat spring 15, made up a plurality of leaves is supported at its ends on the blocks 5ª and centrally engaging said spring is a screw 16, which extends through the threaded opening 3, in the cross bar 2. The spring is centrally bowed, and the screw engages same at the bowed portion as shown.

Meshing with the gear wheel 8, is a pinion 19, and to the latter is attached a handle 20, by means of which the mangle may be operated manually. Also meshing with the gear wheel 8, is a pinion 21, and on the shaft of same is a band pulley 22, by means of which the mangle may be operated by power.

The roller 13, is centrally formed with an annular recess 23, and a resilient flat ring 24, is adapted to be seated therein. When in the recess the ring is held in place by a screw 25.

A table or platform 26 is supported between the side frames, in a horizontal plane just below the horizontal plane of the top of the lower roller 7.

In operation, if it be desired to mangle clothes without buttons or other fasteners, the ring 24, is fastened in the recess 23, by the screw 25, and the screw 16, is adjusted to place the proper tension on the spring 15, and through the gearing described the rollers which are of resilient material are revolved and the clothes are as usual in machines of this type fed over the platform and pressed smooth.

With the ring in place the surface of the upper roller is smooth throughout its full length and the clothes can be pressed at any point between the rollers. If however it be desired to mangle clothes having buttons or other fasteners, the screw 25 is withdrawn, and the resilient ring is removed, thereby exposing the annular recess 23. The screw is readjusted, and the garments are folded so as to bring all the buttons in substantial alinement with the central depression 23, while the portions of the garments without buttons are spread out between the rollers on opposite sides of the depression. In this way the clothes are pressed smooth exceept the small streak passing through the depression, and even this is subjected to some slight pressure.

The elongated teeth of the pinions 9 and 14, are for the purpose of maintaining meshing relation when the rollers are forced apart when an unusual wad of clothes is acted upon.

From the foregoing description it will be seen that I have provided a simple and effective mangle for mangling clothes, and one which prevents tearing off, flattening or cracking of the buttons when the ring is removed.

What I claim is:—

In a mangle, the combination of a frame, a pair of rollers mounted in the frame, one of the rollers having annular depression through which buttons may pass and the clothes squeezed each side of the depression, detachable means to close the depression to make the surface of the roller smooth, and a means for creating pressure between the rollers.

In testimony whereof I affix my signature.

VICTOR A. NELSON.

Copies of this patent may be obtained for five cents each, by addressing the "Commissioner of Patents, Washington, D. C."